(12) United States Patent
Taneichi

(10) Patent No.: US 9,163,655 B2
(45) Date of Patent: Oct. 20, 2015

(54) THRUST NUT

(71) Applicant: Kaoru Taneichi, Atsugi (JP)

(72) Inventor: Kaoru Taneichi, Atsugi (JP)

( * ) Notice: Subject to any disclaimer, the term of this patent is extended or adjusted under 35 U.S.C. 154(b) by 0 days.

(21) Appl. No.: 14/154,537

(22) Filed: Jan. 14, 2014

(65) Prior Publication Data

US 2015/0198197 A1 Jul. 16, 2015

(51) Int. Cl.
*F16B 37/08* (2006.01)
*F16B 43/00* (2006.01)

(52) U.S. Cl.
CPC ......... *F16B 37/0807* (2013.01); *F16B 37/0857* (2013.01); *F16B 43/00* (2013.01)

(58) Field of Classification Search
CPC .......................... F16B 37/0857; F16B 37/0864
USPC .................................. 411/267, 270, 277, 278
See application file for complete search history.

(56) References Cited

U.S. PATENT DOCUMENTS

| | | | | |
|---|---|---|---|---|
| 3,151,652 A | * | 10/1964 | Zahodiakin | 411/267 |
| 3,151,653 A | * | 10/1964 | Zahodfakin | 411/267 |
| 3,352,341 A | * | 11/1967 | Schertz | 411/270 |
| 4,363,164 A | * | 12/1982 | Okada | 29/270 |
| 5,340,252 A | * | 8/1994 | Weddendorf | 411/267 |
| 6,007,284 A | * | 12/1999 | Taneichi | 411/267 |
| 6,712,574 B1 | * | 3/2004 | Roopnarine | 411/433 |
| 2005/0238460 A1 | * | 10/2005 | Li | 411/432 |

FOREIGN PATENT DOCUMENTS

| | | |
|---|---|---|
| JP | 4201219 | 10/2008 |
| JP | 4531585 | 6/2010 |

* cited by examiner

*Primary Examiner* — Flemming Saether
(74) *Attorney, Agent, or Firm* — Jordan and Hamburg LLP

(57) ABSTRACT

A nut main body has a slanted hole with a smaller inner end portion having a plurality of stepped portions of differing height. This gives the slanted hole a differing depth relative to a large-diameter end portion of the slanted hole at a plurality of locations about a circumference of the slanted hole. A plurality of nut segments are slidable within the slanted hole and come into contact with at least one of the stepped portions. The nut segments have screw threads at an inner wall surface. A washer is provided at a large-diameter side of the plurality of nut segments. A bias spring is attached within the nut main body so as to urge the plurality of nut segments towards the small-diameter side of the nut main body with the washer therebetween. A stopper piece holds the bias spring within the nut main body.

4 Claims, 20 Drawing Sheets

THRUST NUT

BACKGROUND OF THE INVENTION

1. Field of the Invention

The present invention relates to a thrust nut that includes a plurality of nut segments that slide in an axial direction and are screwed together with a screw portion of a bolt by being rotated in a fastening direction, after the bolt is inserted to a predetermined position.

2. Description of the Related Art

This type of thrust nut of the past is configured by: a nut main body of which an outer wall is formed into a polygonal shape and that has a slanted hole in an inner wall that successively becomes smaller in diameter; a stopper piece that has a bolt insertion hole and is formed in an end portion on a large-diameter side of the nut main body; three guide pieces that are formed in an axial-center direction on an inner wall surface of the nut main body; three nut segments that are attached between the guide pieces such as to be slidable in the axial-center direction and on an inner wall surface of which threads are formed that are screwed together with the bolt; a flange-shaped attachment piece that is fixed to an end portion on the small-diameter side of the nut main body, prevents detachment of the three nut segments, and projects further outward than an outer circumferential portion of the nut main body; and a bias spring that is housed within the nut main body such as to urge the three nut segments towards the small-diameter side of the nut main body at all times.

The thrust nut, configured as described above, is configured such that the three nut segments are screwed together with a screw portion of a bolt by being inserted into the bolt and rotated in a fastening direction. However, there is a problem in that a clearance amounting to a single thread is present or not present at all times.

[Patent Literature 1] Patent Publication No. 4531585
[Patent Literature 2] Patent Publication No. 4201210

SUMMARY OF THE INVENTION

The present invention has been achieved in light of such issues of the past. An object of the present invention is to provide a thrust nut of which fastening operation is easy and handling is easy, in which two or more nut segments are each capable of being urged in a counter-bolt-insertion direction even when a bolt is inserted, screw portions of the two or more nut segments are screwed together with a screw portion of the bolt with certainty by being rotated in a fastening direction, the screwed engagement allows the screw portions of the two or more nut segments to be screwed such as to be continuous with the screw portion of the bolt, and the two or more nut segments can be worked such as to be capable of maintaining a secure screwed state.

The description above, other objects, and novel features of the present invention will become more completely clear when the following description is read with reference to the accompanying drawings.

However, the drawings are mainly for description and do not limit the technical scope of the present invention.

To achieve the above-described object, a thrust nut of the present invention is configured by: a nut main body of which an outer wall is formed into a polygonal shape and that has a slanted hole of which an inner diameter becomes successively smaller, and a small-diameter end portion is formed into two or more stepped portions; two or more nut segments that are slidable within the slanted hole of the nut main body, or which end portions on the small-diameter side come into contact with stepped portions, and pressing projection pieces are formed in end portions on the large-diameter side; screw portions formed on inner wall surfaces of the two or more nut segments such as to be continuous with the nut segments that are in contact with a stepped portion having the smallest diameter; a washer that is provided in the end portions on the large-diameter side of the two or more nut segments; a bias spring that is attached within the nut main body such as to urge the two or more nut segments towards the small-diameter side at all times with the washer therebetween; and a stopper piece that holds the bias spring within the nut main body, in which a bolt insertion hole is formed, and is attached to the nut main body.

Effects of the Invention

As is clear from the description above, the present invention achieves the following effects:

(1) According to a first aspect, the two or more nut segments are each capable of being evenly urged with certainty towards a direction in which the two or more nut segments are screwed together with the screw portion of a bolt, even when the nut main body is thrust onto the bolt. In addition, the screw portion of the bolt and the screw portions of the two or more nut segments can be screwed together such as to be continuous, by rotation in the fastening direction.

Therefore, a secure screwed state can be maintained.

(2) As a result of above-described (1), two or more stepped portions are formed in a small-diameter end portion of the slanted hole of the nut main body. End portions of the nut segments on the small-diameter side are placed in contact with the stepped portions. Therefore, the two or more nut segments can be disposed with certainty such that the screw portions are continuous.

Therefore, attachment of the two or more nut segments into the nut main body can be easily performed.

(3) According to a second aspect, effects similar to (1) and (2) are achieved.

(4) According to a third aspect as well, effects similar to (1) and (2) are achieved. In addition, as a result of the washer that can lock with a fastening member, even when the fastening member contracts, the two or more nut segments move in the fastening direction. Therefore, loosening of the nut can be prevented with certainty.

Figure 1:
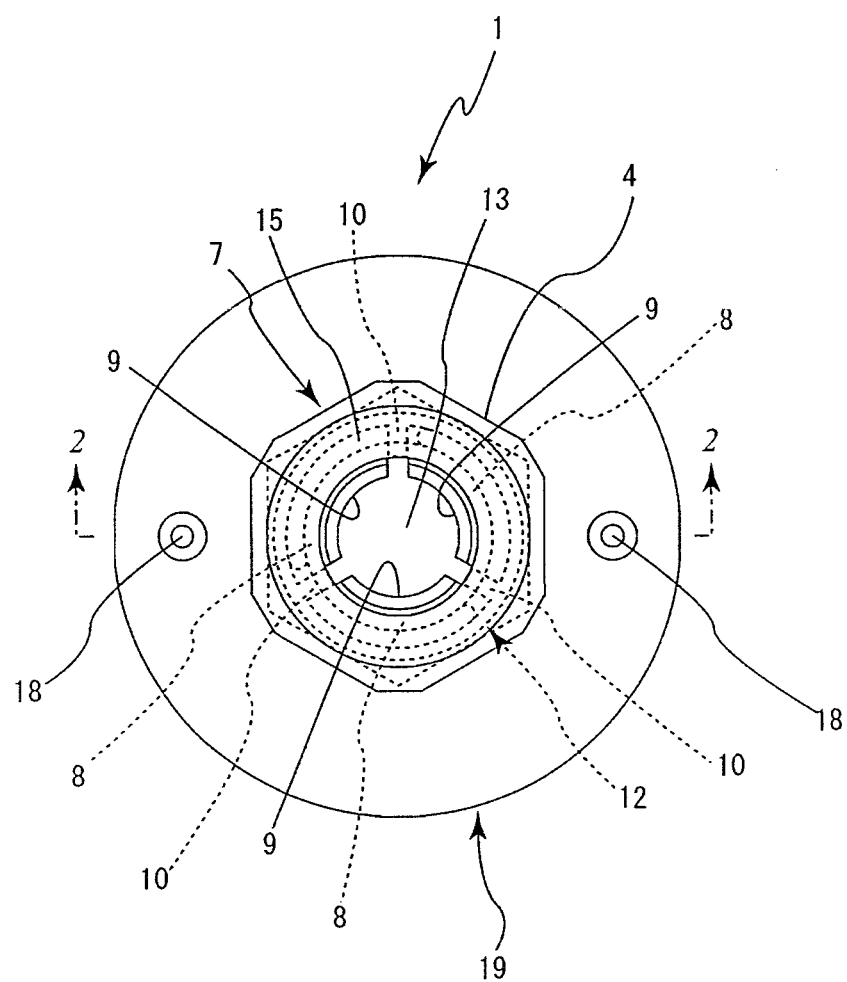
FIG. 1 is a planar view of a first embodiment for carrying out the present invention.
Figure 2:
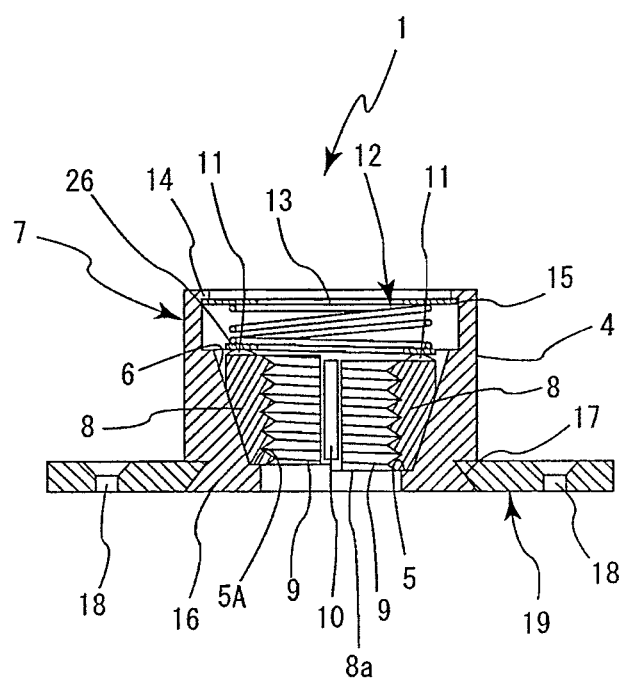
FIG. 2 is a cross-sectional view taken along line 2-2 in FIG. 1.
Figure 3:
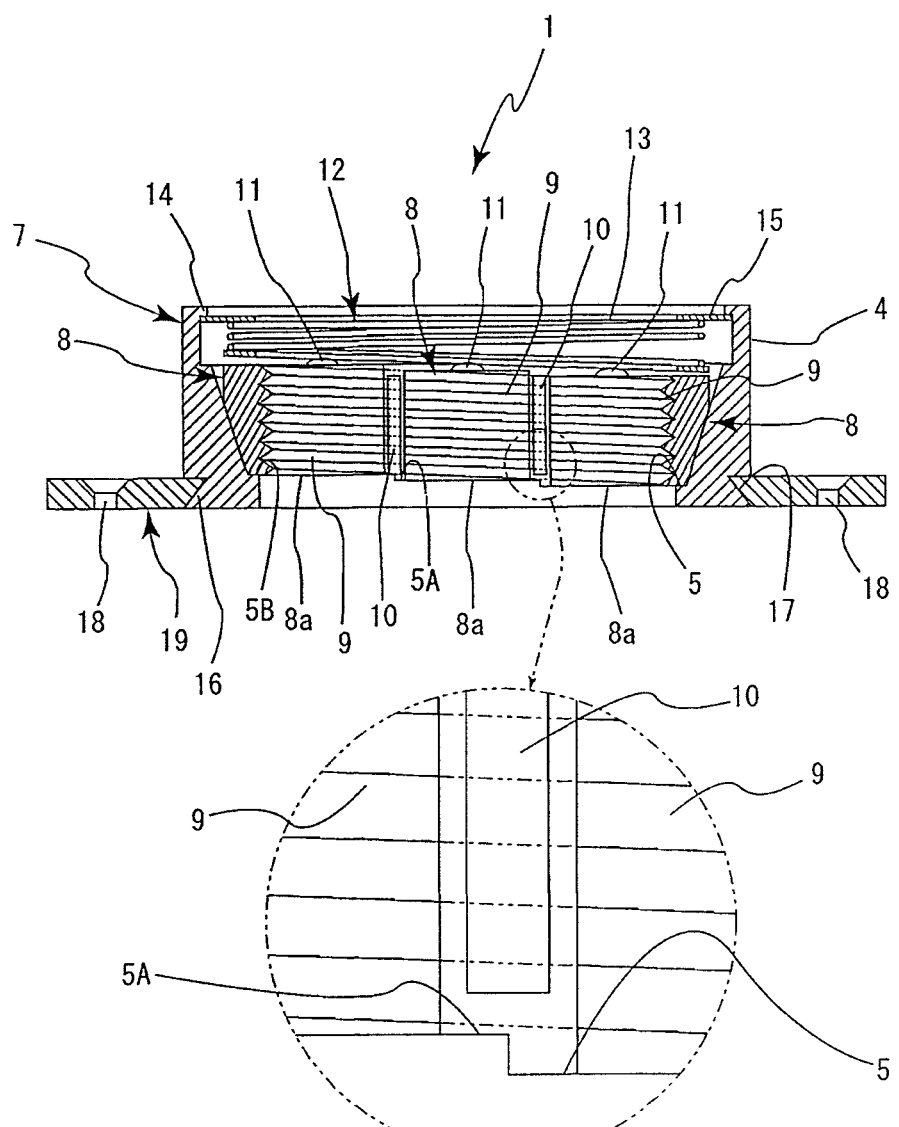
FIG. 3 is a development view of a nut main body, showing a steppe d portion according to the first embodiment for carrying out the present invention.
Figure 4:
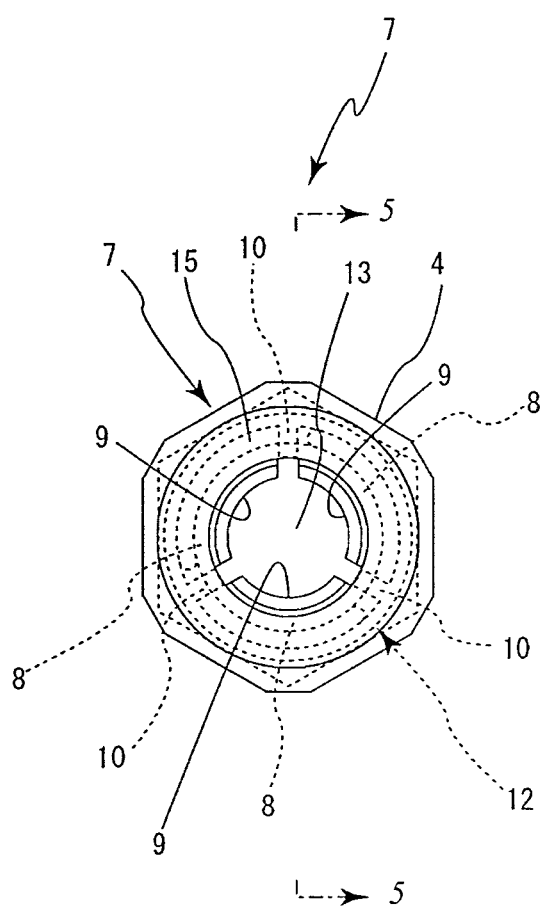
FIG. 4 is a planar view of the nut main body according to the first embodiment for carrying out the present invention.
Figure 5:
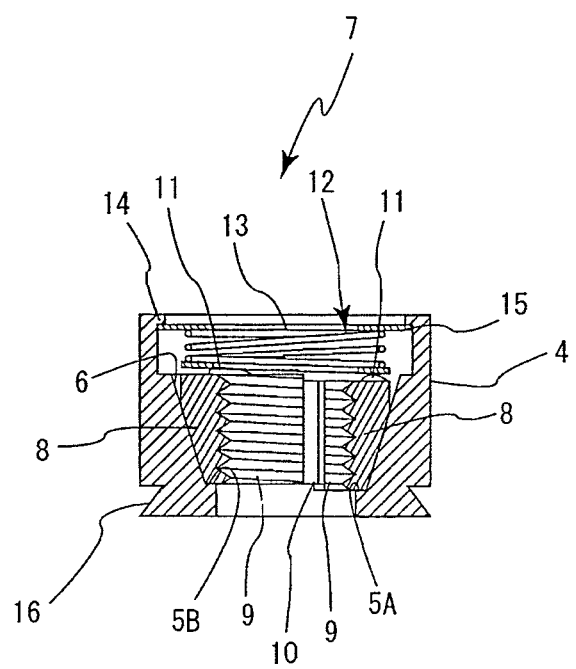
FIG. 5 is a cross-sectional view taken along line 5-5 in FIG. 4.
Figure 6:
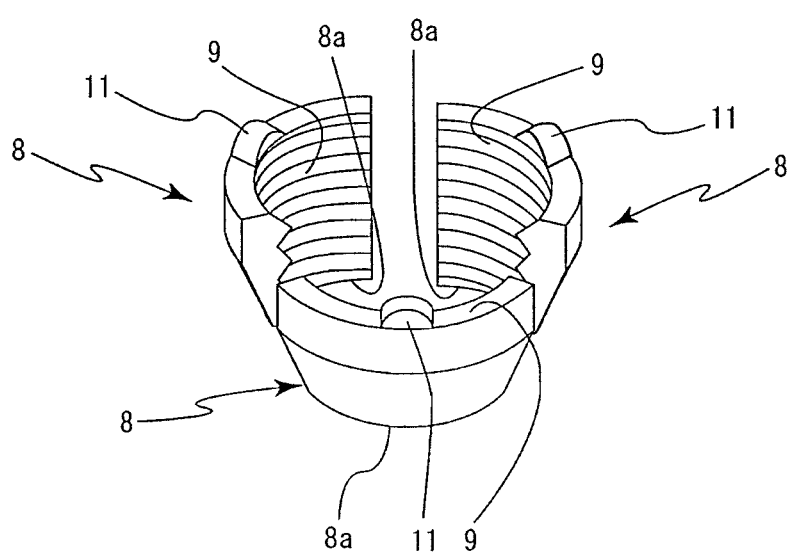
FIG. 6 is an explanatory diagram of nut segments according to the first embodiment for carrying out the present invention.
Figure 7:
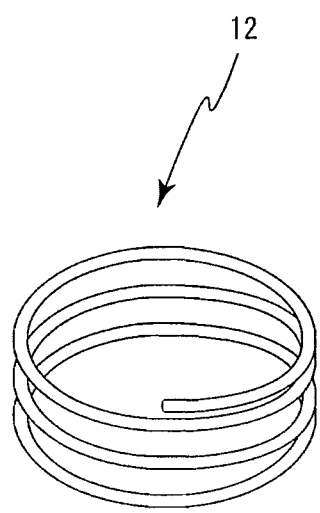
FIG. 7 is an explanatory diagram of a bias spring according to the first embodiment for carrying out the present invention.

EXPLANATION OF REFERENCE NUMBERS 1, 1A, 1B, 1C: thrust nut
2: bolt
3: screw portion
4: outer wall
5, 5A, 5b: stepped portion
6: slanted hole
7: nut main body
8: nut segment
9: screw portion
10, 10A: guide piece
11, 11A: projection piece
12, 12A: bias spring
12: bolt insertion hole
14: rivet
15: stopper piece
16: washer insertion piece
17: rivet
18: screw insertion hole
19, 19A: washer
20: wood member
21: bolt insertion hole
22: washer
23: screw
24: ring-shaped groove
25: engaging piece
26: washer

DETAILED DESCRIPTION OF THE PREFERRED EMBODIMENTS

The present invention will be described in detail based on embodiments for carrying out the present invention shown in the drawings.

According to a first embodiment for carrying out the present invention shown in FIG. 1 to FIG. 11, reference number 1 represents a thrust nut of the present invention that can be thrust onto a bolt 2 to a predetermined position, and screwed together with a right screw portion 3 of the bolt 2, thereby being fastened and fixed, by being rotated in a fastening direction from the predetermined position. The thrust nut 1 is configured by: a nut main body 7 of which an outer wall 4 has a polygonal shape that is hexagonal according to the first embodiment, the nut main body 7 having a slanted hole 6 of which the inner diameter becomes successively smaller and a small-diameter end portion is formed into two or more stepped portions that are three stepped portions 5, 5A, and 5B according to the first embodiment of the present invention; three nut segments 8, 8, and 8 that are slidable within the slanted hole 6 of the nut main body 7, of which small-diameter side end portions 8a, 8a, and 8a are in contact with the stepped portions 5, 5A, and 5B, and pressing projection pieces 11, 11, and 11 are formed in center portions of large-diameter side end portions 8b, 8b, and 8b; right screw portions 9, 9, and 9 that are formed on the inner wall surfaces of the three nut segments 8, 8, and 8 such as to be continuous with the nut segments 8 that are in contact with the stepped portion 5 having the smallest diameter; guide pieces 10, 10, and 10 that are formed in an axial-center direction on the inner wall surfaces at end portion positions of the stepped portions 5, 5A, and 5B in the slanted hole 6 of the nut main body 7, between the nut segments 8, 8, and 8; a washer 26 that is disposed above the pressing projection pieces 11, 11, and 11 of the nut segments 8, 8, and 8; a bias spring 12 that uses a coil spring attached within the nut main body 7 such as to urge the nut segments 8, 8, and 8 towards the small-diameter side at all times with the washer 26, and the pressing projection pieces 11, 11, and 11 therebetween; a washer-shaped stopper piece 15 that holds the bias spring 12 within the nut main body 7, in which a bolt insertion hole 13 is formed, and is prevented from falling out by a rivet 14 in an end portion of the nut main body 7; a ring-shaped washer insertion piece 16 that is formed in an end portion on the small-diameter side of the nut main body 7; and a washer 19 into which the washer insertion piece 16 is inserted, that has screw insertion holes 18 and 18, and of which the tip portion is rotatably attached by a rivet 17.

In the thrust nut 1 configured as described above, the nut segments 8, 8, and 8 are set within the slanted hole 6 of the nut main body 7. The pressing projection pieces 11, 11, and 11 of the nut segments 8, 8, and 8 are pressed by the biasing force of the bias spring 12 with the washer 26 therebetween. The end portions 8a, 8a, and 8a on the small-diameter side of the nut segments 8, 8, and 8 are set such as to be pressed into the stepped portions 5, 5A and 5B. As a result, the nut segments 8, 8, and 8 are automatically disposed by the stepped portions 5, 5A, and 5B such that right screw portions 9, 9, and 9 of the nut segments 8, 8, and 8 are screwed with the right screw portion 3 of the bolt 2 in a continuous state.

Figure 8:
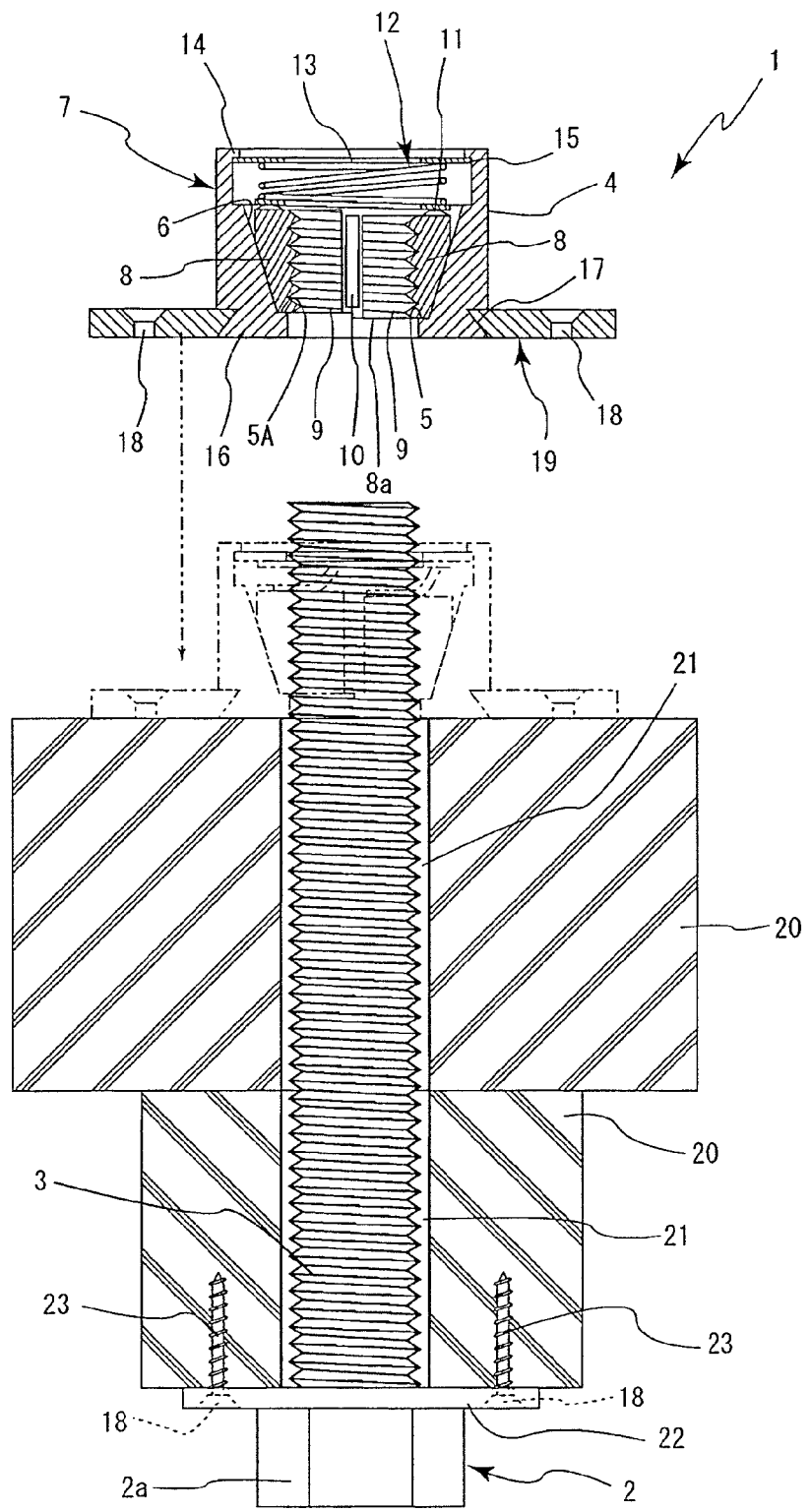
FIG. 8 is an explanatory diagram of a state in which a bolt is inserted according to the first embodiment for carrying out the present invention.
Figure 9:
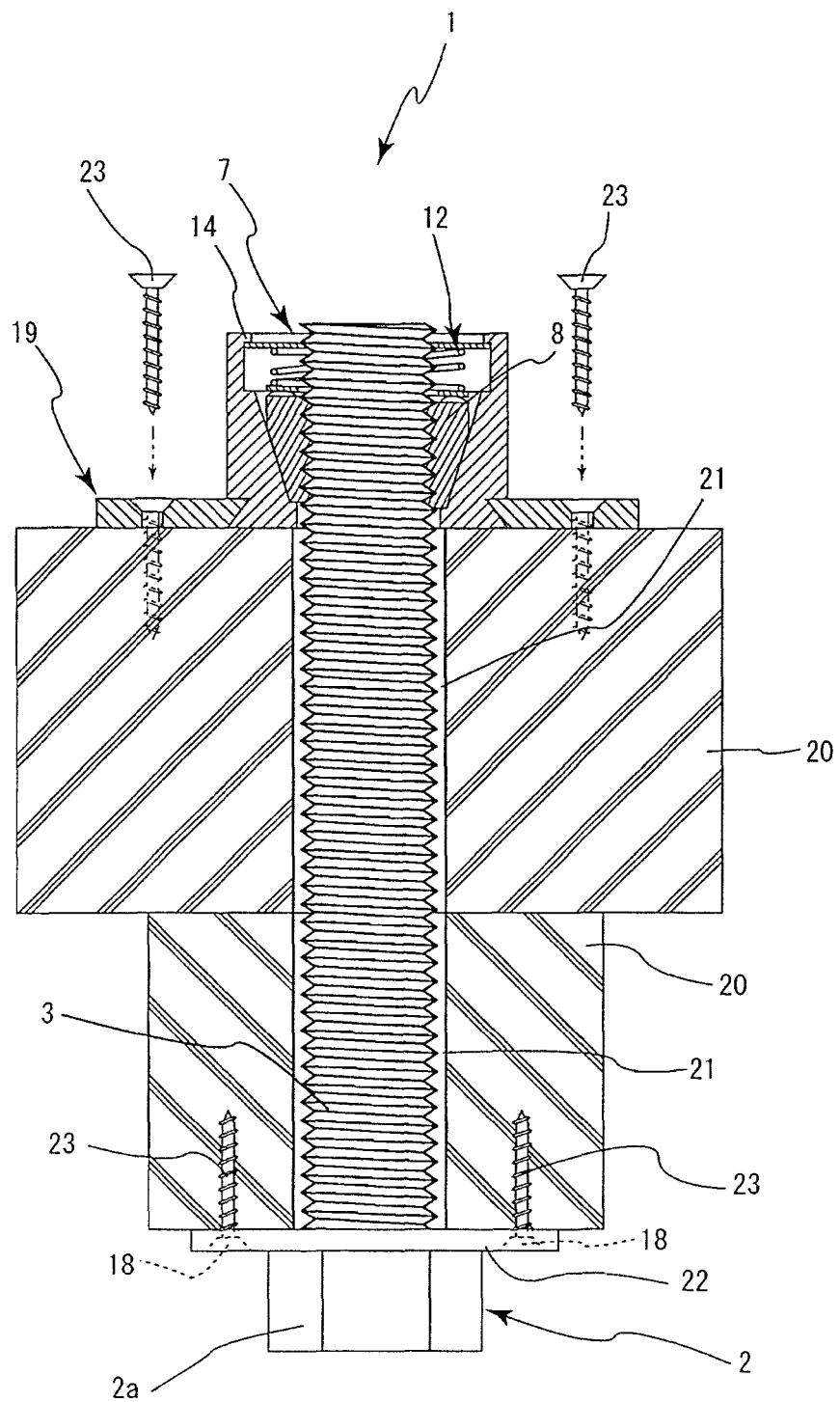
FIG. 9 is an explanatory diagram of a state in which a washer is fixed to a fastening member according to the first embodiment for carrying out the present invention.

In the thrust nut 1 assembled as described above, the bolt 2 is inserted into bolt holes 21 and 21 formed in wood members 20 and 20 that are fastening members to be connected as shown in FIG. 8. A washer 22 having screw insertion holes 18 and 18 is fixed to a head portion 2a of the bolt 2 by welding or the like. Screws 23 and 23 are inserted into the screw insertion holes 18 and 18 of the washer 22 and driven into the wood member 20, thereby fixing the washer 22 to the wood member 20. Thereafter, the thrust nut I is thrust onto the tip portion of the bolt 2 that projects from the bolt insertion hole 21. The screws 23 and 23 are inserted into the screw insertion holes 18 and 18 in the washer 19 as shown in FIG. 9 and driven into the wood member 20, thereby fixing the washer 19 to the wood member 20.

At this time, the nut segments 8, 8, and 8 within the nut main body 7 are pressed back against the biasing force of the bias spring 12 by the right screw portion 3 of the bolt 2. When the nut segments 8, 8, and 8 spread open, the bolt 2 smoothly passes through, and the thrusting of the thrust nut 1 is stopped, the biasing force of the bias spring 12 urges the nut segments 8, 8, and 8 towards the direction of the end portions 8a, 8a, and 8a on the small-diameter side, with the washer 26 and the pressing projection pieces 11, 11, and 11 of the nut segments 8, 8, and 8 therebetween. As a result, the nut segments 8, 8, and 8 are pressed back, with certainty, into to a position at which the right screw portion 3 of the bolt 2 and the right screw portions 9, 9, and 9 of the nut segments 8, 8, and 8 are screwed together.

Figure 10:
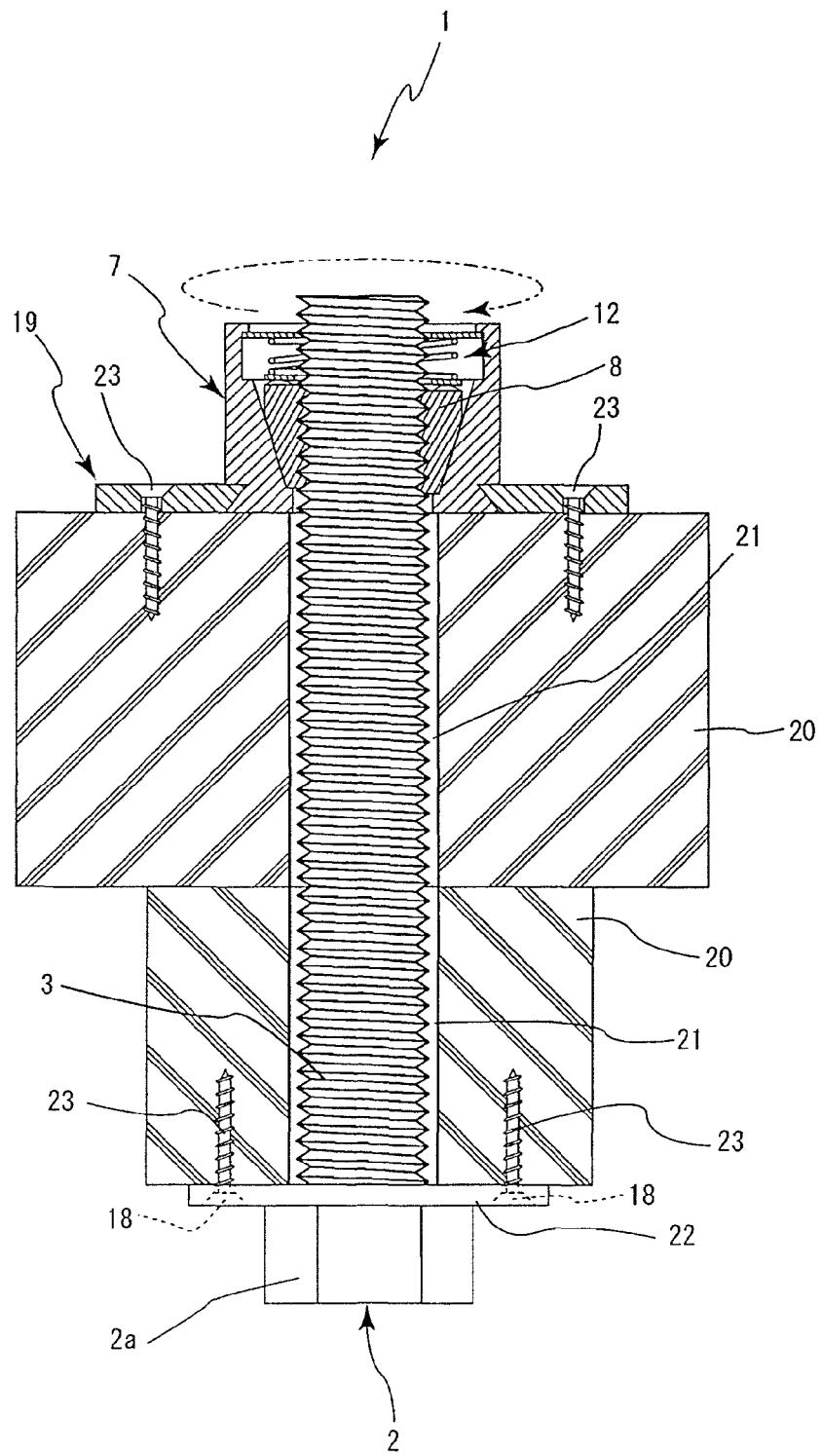
FIG. 10 is an explanatory diagram of a state in which the nut main body is rotated in a fastening direction, fastened, and fixed according to the first embodiment for carrying out the present invention.
Figure 11:
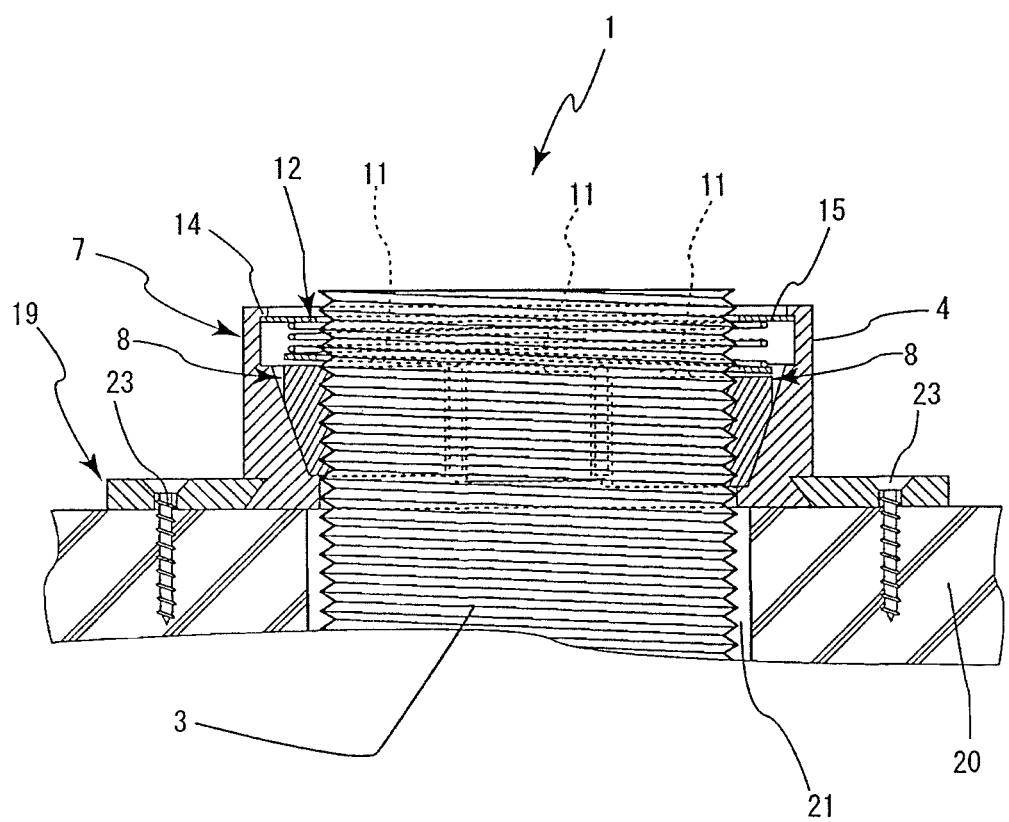
FIG. 11 is a development view of a state in which the bolt and the nut segments are screwed together according to the first embodiment for carrying out the present invention.

In this state, when the nut main body 7 is rotated in the fastening direction as shown in FIG. 10, the nut segments 8, 8, and 8 are each urged towards the direction of the end portions 8a, 8a, and 8a on the small-diameter side with certainty by the biasing force of the bias spring 12, as shown in FIG. 11. The right screw portion 3 of the bolt 2 and the right screw portions 9, 9, and 9 of the nut segments 8, 8, and 8 are screwed together such as to be continuous, and the nut main body 7 can be fastened and fixed.

In an instance in which the wood members 20 and 20 that are fastening members contract during fastening and fixing, the nut main body 7 moves in the contracting direction via the washer 19. Therefore, the biasing force of the bias spring 12 is transmitted to the pressing projection pieces 11, 11, and 11 of the nut segments 8, 8, and 8 via the washer 26. The nut segments 8, 8, and 8 can be moved in the fastening direction with certainty, and automatically tightened.

[Other Embodiments for Carrying out the Invention]

Next, other embodiments for carrying out the present invention, shown in FIG. 12 to FIG. 20, will be described. In the description of the other embodiments for carrying out the present invention, constituent components that are the same as those according to the first embodiment for carrying out the present invention are given the same reference numbers. Redundant descriptions are omitted.

Figure 12:
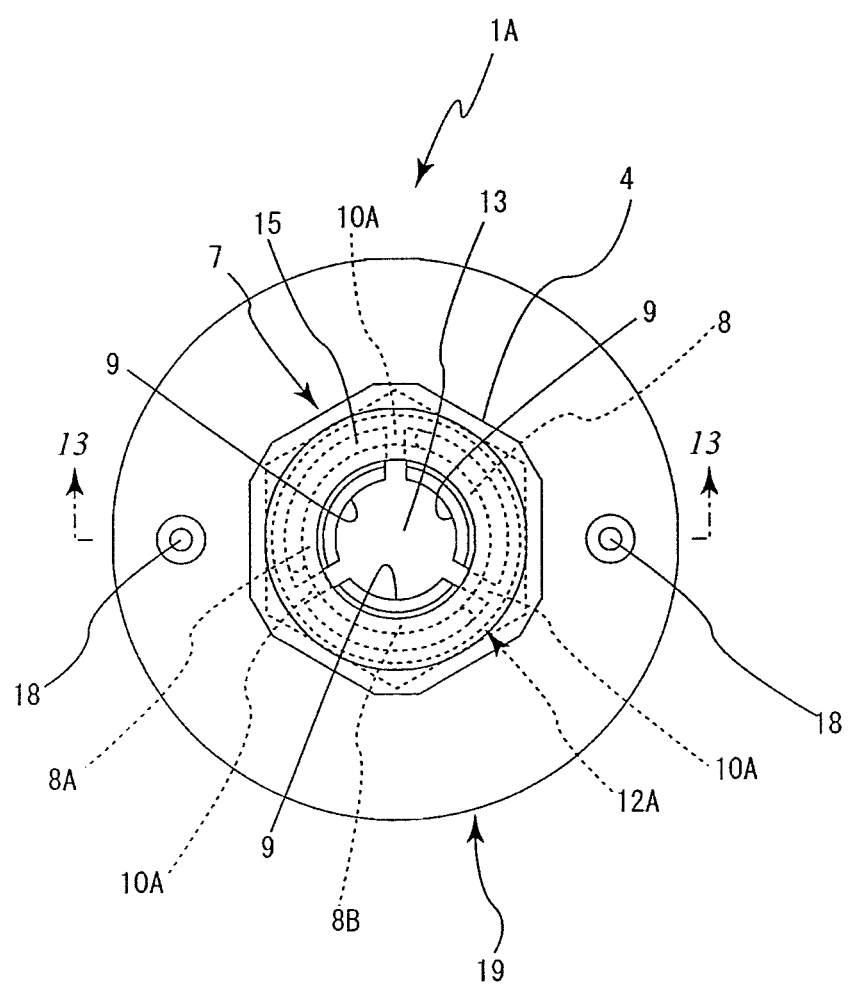
FIG. 12 is a planar view of a second embodiment for carrying out the present invention.
Figure 13:
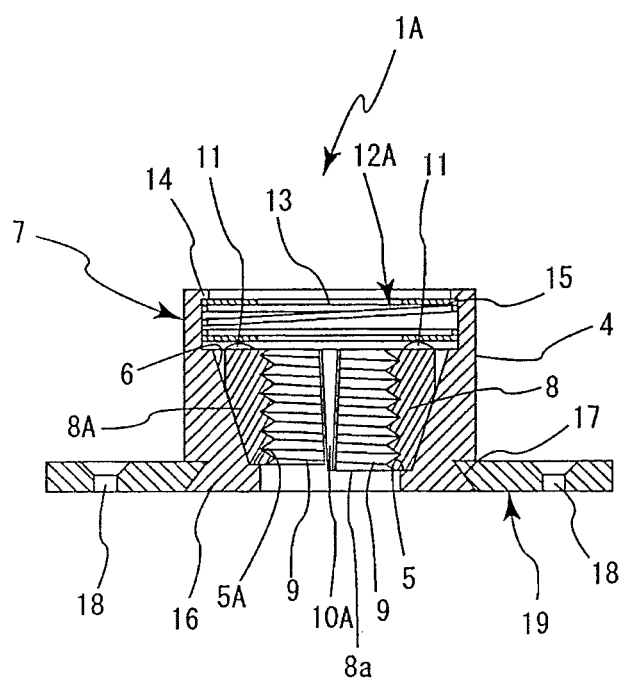
FIG. 13 is a cross-sectional view taken along line 13-13 in FIG. 12.
Figure 14:
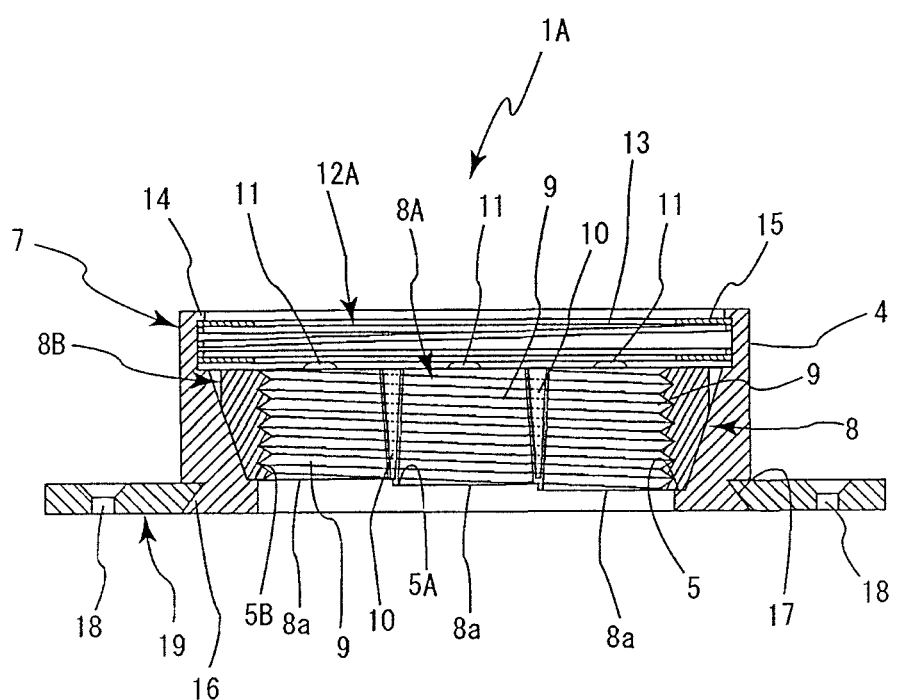
FIG. 14 is a development view of a stepped portion according to the second embodiment for carrying out the present invention.

According to a second embodiment for carrying out the present invention shown in FIG. 12 to FIG. 14, the main difference with the first embodiment for carrying out the present invention is that nut-segments 8, 8A, and 8B, and wedge-shaped guide pieces 10A, 10A, and 10A are used. The upper end portions of the nut-segments 8, 8A, and 8B are on substantially the same plane in a state in which the nut segments 8, 8A, and 8B are housed within the slanted hole 6 of the nut main body 7. The guide pieces 10A, 10A, and 10A reduce the allowance of the nut segments 8, 8A, and 8B. A thrust nut 1A that is configured using the nut segments 8, 8A, and 8B, formed as described above, achieves working effects similar to those according to the first embodiment for carrying out the present invention. In addition, the biasing force of the bias spring 12 can he evenly transmitted to the nut segments 8, 8A, and 8B.

Figure 15:
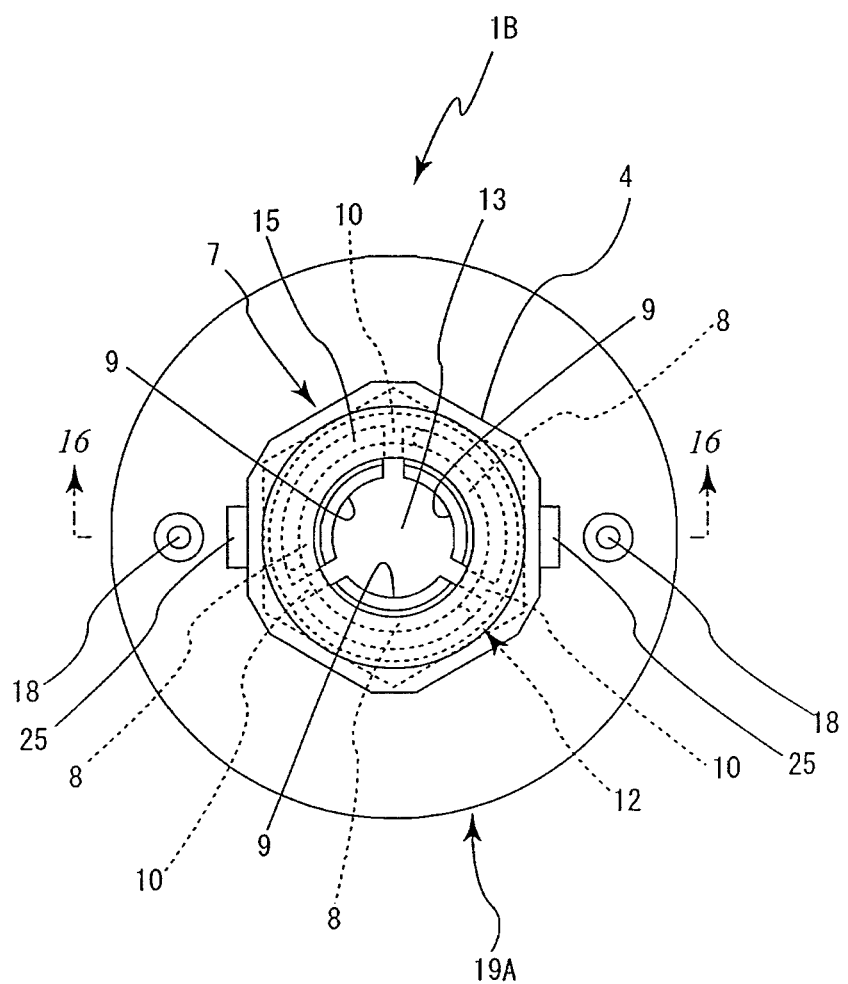
FIG. 15 is a planar view of a third embodiment for carrying out the present invention.
Figure 16:
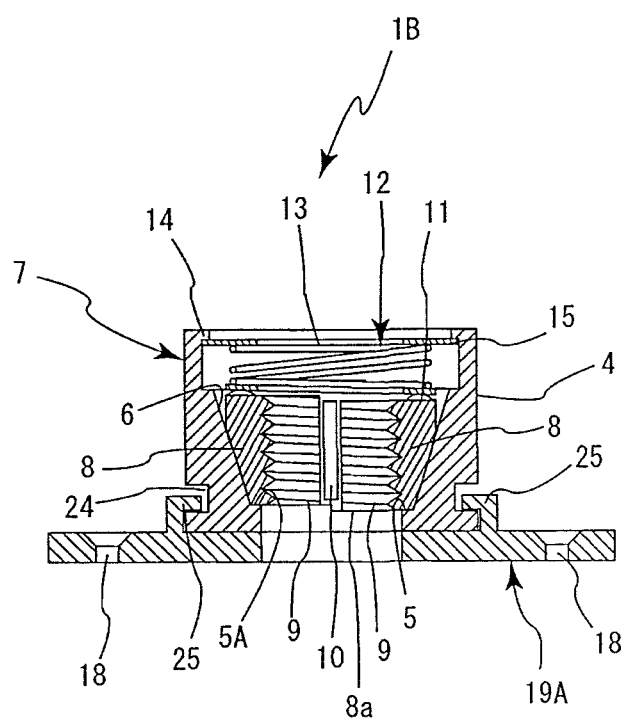
FIG. 16 is a cross-sectional view taken along line 16-16 in FIG. 15.
Figure 17:
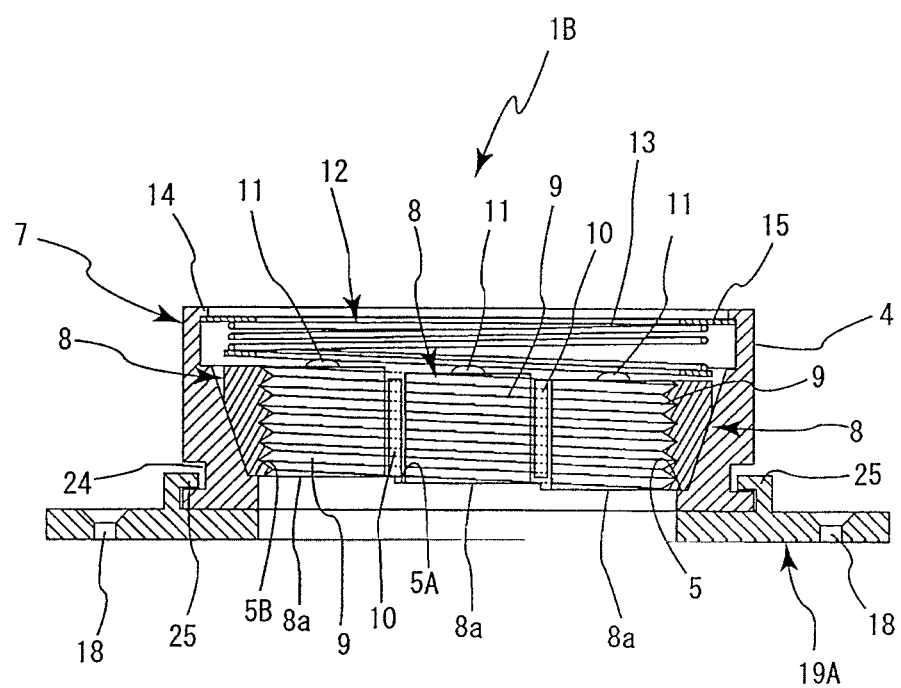
FIG. 17 is a development view of a stepped portion according to the third embodiment for carrying out the present invention.

According to a third embodiment for carrying out the present invention shown in FIG. 15 to FIG. 17, the main difference with the first embodiment for carrying out the present invention is that a ring-shaped groove 24 is formed in an outer circumferential portion of the nut main body 7 on the small-diameter side, and a washer 19A is used in which reverse L-shaped engaging pieces 25 and 25 are formed. The engaging pieces 25 and 25 are engaged with the nut main body 7 in areas opposing the ring-shaped groove 24. A thrust nut 1B that is configured using the nut main body 7 in which the ring-shaped groove 24 is formed and the wisher 19A, formed as described above, can also achieve working effects similar to those according to the first it for carrying out the present invention.

Figure 18:
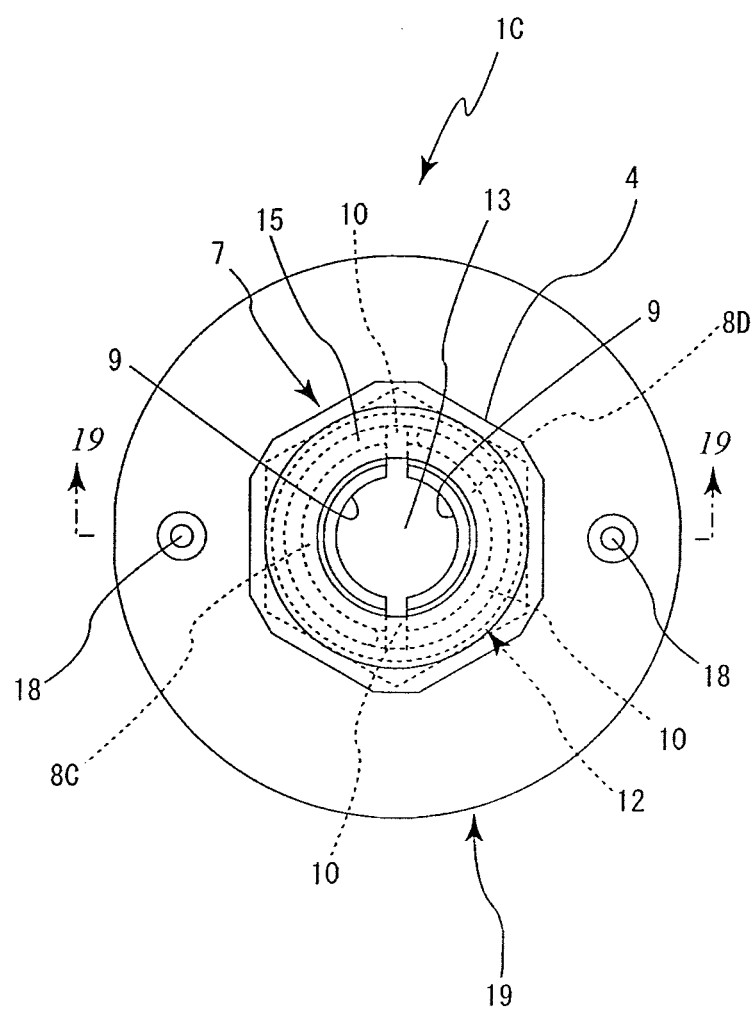
FIG. 18 is a planar view of a fourth embodiment for carrying out the present invention.
Figure 19:
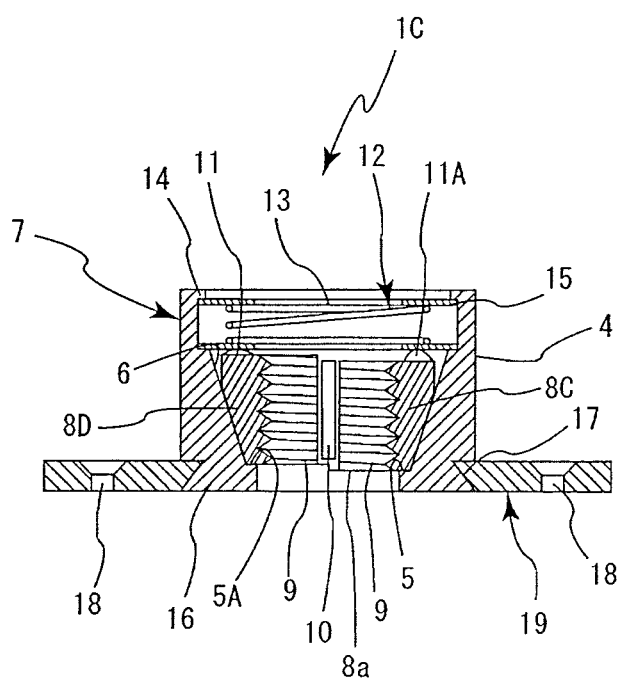
FIG. 19 is a cross-sectional view taken along line 19-19 in FIG. 18.
Figure 20:
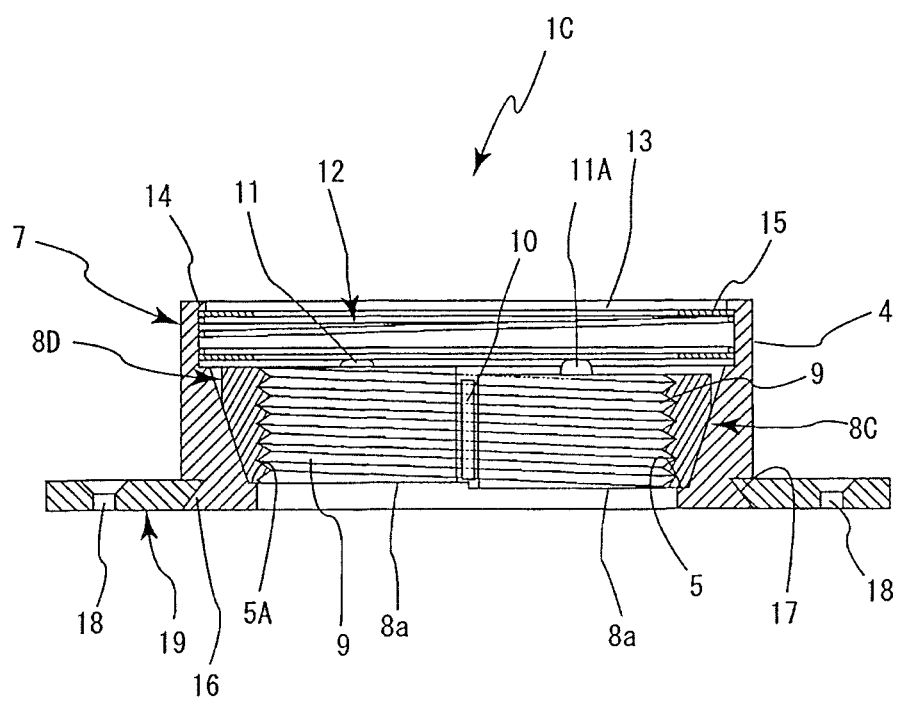
FIG. 20 is a development view of a stepped portion according to the fourth embodiment for carrying out the present invention.

According to a fourth embodiment for carrying out the present invention shown in FIG. 18 to FIG. 20, the main difference with the first embodiment for carrying out the present invention is that two stepped portions 5 and SA are formed in the small-diameter end portion of the slanted hole 6 of the nut main body 7, and pressing projection pieces 11 and 11A are formed that have differing heights, of which the lower end portions come into contact with the two stepped portions 5 and 5A, and the upper surfaces are on a same plane in the center portions of the large-diameter end portions 8b and 8b. In addition, two nut segments 8C and 8C are used that rotate integrally with the nut main body 7. A thrust nut 1C that is configured using the two nut segments 8C and 8D in this way can also achieve working effects similar to those according to the first embodiment for carrying out the present invention.

The stopper piece may be formed into a cylindrical shape as in Japanese Laid-Open Patent Publication No 2012-47244. The stopper piece may be fitted and fixed such as to cover the nut main body 7, or may be fixed to the nut main body 7 by an adhesive or by welding.

In addition, although use of the bolt 2 in which the right screw portion 3 is formed is described, the present invention is not limited thereto. The thrust nut may be configured such that a bolt on which a left screw portion is formed can be used, by using nut segments in which left screw portions are formed that can be screwed together with the left screw portion of the bolt.

According to the embodiments of the present invention, a thrust nut in which the nut main body is integrally formed is described. However, the present invention is not limited thereto. Similar working effects can be achieved even with a nut main body configured by an inner cylinder member of which the inner diameter becomes successively smaller and in which two or more stepped portions are formed in the small-diameter end portion, and an outer cylinder member of which the outer wall is formed into a polygonal shape, as disclosed in Japanese Laid-Open Patent Publication No. 2012-47244.

In addition, according to the embodiments of the present invention, materials of the components are not specified. However, materials that can be used for a nut, such as an iron material, various alloys, synthetic resin materials, carbon fiber materials, are selectively used.

Industrial Applicability

The present invention is used in an industry for manufacturing a thrust nut that is screwed together with a screw portion of a bolt by being rotated in a fastening direction after the bolt is inserted to a predetermined position.

What is claimed is:
1. A thrust nut comprising:
a nut main body of which an outer wall is formed into a polygonal shape and that has a slanted hole of which an inner diameter becomes successively smaller, and a small-diameter end portion having about a circumference of said small-diameter end portion a plurality of stepped portions of differing height so that said slanted hole has a differing depth relative to a large-diameter end portion of the slanted hole at a plurality of locations about a circumference of the slanted hole;

a plurality of nut segments that are slidable within the slanted hole of the nut main body, each one of the plurality of nut segments having a small-diameter side that comes into contact with at least one of said plurality of stepped portions, and each one of the plurality of nut segments having a pressing projection piece formed at a large-diameter side of said one nut segment;

a respective set of screw thread portions formed on an inner wall surface of each one of said plurality of nut segments, said respective set occurring from said large-diameter side to said small-diameter side of said one nut segment and including a thread portion extending to said small diameter side that is in contact with said at least one stepped portion;

a washer that is provided at the large-diameter side of the plurality of nut segments;

a bias spring that is attached within the nut main body such as to urge the plurality of nut segments towards the small-diameter side at all times with the washer therebetween; and a stopper piece, in which a bolt insertion hole is formed, that holds the bias spring within the nut main body and is attached to the nut main body.

2. The thrust nut according to claim 1, wherein:

a plurality of guide pieces are formed on an inner wall surface of the nut main body that guide sliding of the plurality of nut segments in an axial-center direction.

3. The thrust nut according to any one of claim 1 or 2, wherein:

a washer capable of locking with a fastening member is fixed or rotatably attached to a small-diameter end portion of the nut main body.

4. The thrust nut according to claim 2, wherein each one of said guide pieces extends axially along an inner wall surface of said nut main body toward a corresponding stepped portion among said plurality of stepped portions at said small-diameter end portion of said nut main body.

* * * * *